United States Patent
Braun

(10) Patent No.: US 6,443,511 B2
(45) Date of Patent: Sep. 3, 2002

(54) ENERGY ABSORBER FOR MOTOR VEHICLE BUMPERS

(75) Inventor: Stefan Braun, Bötzingen (DE)

(73) Assignee: Peguform-Werke GmbH, Bötzingen (DE)

( * ) Notice: Subject to any disclaimer, the term of this patent is extended or adjusted under 35 U.S.C. 154(b) by 0 days.

(21) Appl. No.: 09/901,330

(22) Filed: Jul. 9, 2001

Related U.S. Application Data

(62) Division of application No. 09/483,243, filed on Jan. 14, 2000, now Pat. No. 6,290,272.

(30) Foreign Application Priority Data

Dec. 3, 1998 (DE) .......................................... 198 61 026

(51) Int. Cl.⁷ .............................................. B60R 19/03
(52) U.S. Cl. ..................... 293/120; 293/102; 293/132; 293/133; 296/189
(58) Field of Search .................................. 293/120, 123, 293/146, 132, 133, 102, 110, 136, 130; 296/188, 189

(56) References Cited

U.S. PATENT DOCUMENTS

| | | | |
|---|---|---|---|
| 3,506,295 A | | 4/1970 | Yancey |
| 3,843,182 A | | 10/1974 | Walls et al. |
| 3,871,636 A | | 3/1975 | Boyle |
| 3,930,665 A | * | 1/1976 | Ikawa .......................... 293/70 |
| 3,995,901 A | | 12/1976 | Filbert, Jr. et al. |
| 4,105,236 A | | 8/1978 | Haar |
| 4,822,011 A | * | 4/1989 | Goldbach et al. ....... 293/136 X |
| 5,425,561 A | | 6/1995 | Morgan |
| 5,507,540 A | | 4/1996 | Pernot |
| 6,082,792 A | | 7/2000 | Evans et al. |
| 6,099,055 A | | 8/2000 | Hirota et al. |
| 6,179,355 B1 | * | 1/2001 | Chou et al. .................. 293/120 |

FOREIGN PATENT DOCUMENTS

| | | |
|---|---|---|
| DE | 4401 874 C 1 | 1/1994 |
| EP | 0 664 244 B1 | 1/1995 |

* cited by examiner

Primary Examiner—Stephen T. Gordon
Assistant Examiner—Lori L Coletta
(74) Attorney, Agent, or Firm—Oppedahl & Larson LLP

(57) ABSTRACT

Provided in an energy absorber (1) for bumpers (2, 3) of motor vehicles are stiffening elements (5), which have front sides (6) facing away from a rear mounting structure (4). The stiffening elements (5) have in the longitudinal direction a lateral center-to-center distance from one another that corresponds to the standard dimensions of a human leg. Side faces of the stiffening elements (5) which face one another are designed such that, in the event of collision with a leg, the stiffening elements (5) are deformable independently of one another, and in the event of collision with an object larger than a leg, the stiffening elements (5) engage one another at their side faces in a manner hindering deformation with an abrupt increase in the stiffness of the energy absorber (1). By this means, braking with a relatively low deceleration is achieved in a collision with the leg, whereas the energy absorber (1) is adequately stiff in a collision with a larger object.

2 Claims, 10 Drawing Sheets

ENERGY ABSORBER FOR MOTOR VEHICLE BUMPERS

CROSS REFERENCES TO RELATED APPLICATIONS

This application is a Divisional of Ser. No. 09/483,243, filed Jan. 14, 2000, now U.S. Pat. No. 6,290,272.

FIELD OF THE INVENTION

The invention relates to an energy absorber for motor vehicle bumpers with a number of stiffening elements arranged between a bumper bracket and a bumper shell of a bumper, wherein the stiffening elements have free-standing front sides facing away from a rear mounting structure that is capable of being fastened to the bumper bracket, and whose centers are also laterally offset from one another in the longitudinal direction.

BACKGROUND OF THE INVENTION

Such an energy absorber for motor vehicle bumpers is known from U.S. Pat. No. 3,506,295. The known energy absorber is stamped out of flat stock and has raised portions projecting on both sides relative to a reference plane at regular intervals, which are offset relative to one another in the longitudinal direction of the bumper. The side edges of the raised portions are joined to one another at their points of intersection, while the crests of the raised portions are flattened and intended for attachment to a bumper shell and a bumper bracket. Attachment to the bumper bracket and bumper shell is accomplished such that the energy absorber can extend in a longitudinal direction in the event of a collision, wherein the energy is distributed very effectively over the entire length of the energy absorber by means of the joining points. While the known energy absorber does have the advantage that the energy is transmitted effectively to the energy absorber, especially in the case of a severe collision with a relatively large object, this does, however, have the effect in collisions with objects that are relatively small in the energy absorber's transverse direction, as for example a human leg, of causing high accelerations on the relatively small object because of the relatively great stiffness of the energy absorber. This is particularly disadvantageous with regard to the greatest possible protection of pedestrians.

Another energy absorber is known from U.S. Pat. No. 3,843,182. This energy absorber has as stiffening elements a number of ribs that are oriented transverse to the longitudinal direction of a bumper bracket of a motor vehicle bumper. The ribs are joined together at their front ends facing away from the bumper bracket, and also at their edge sides, by means of a bumper shell which is manufactured as a single piece with the ribs, and are spaced away from the bumper bracket. Inserted between the ribs are block-like damping bodies. Although it is true that the connection of the ribs to one another prevents the bumper shell from buckling in a collision with a relatively small object because of the stabilization provided by a number of adjacent ribs in addition to the ribs located in the collision area, the amount of energy absorbed by the energy absorber is relatively small.

Known from DE 44 01 874 C1 is a damping element that can be placed between a bumper shell and a bumper bracket of a motor vehicle bumper and that has a rib structure, formed by two spring legs and a web connecting the spring legs, consisting of a longitudinal rib that extends in the bumper bracket's longitudinal direction and a number of transverse ribs oriented perpendicular to the longitudinal rib. While this gridlike rib structure does have elastic deformability even at high collision speeds, the amount of energy absorbed in a collision with a relatively small object is very low as a result of the compound structure of longitudinal rib and transverse ribs.

SUMMARY OF THE INVENTION

Provided in an energy absorber for bumpers of motor vehicles are stiffening elements, which have free-standing front sides facing away from a rear mounting structure. The stiffening elements have in the longitudinal direction a lateral center-to-center distance from one another that corresponds to the standard dimensions of a human leg. Side faces of the stiffening elements which face one another are designed such that, in the event of collision with a leg, the stiffening elements are deformable independently of one another, and in the event of collision with an object larger than a leg, the stiffening elements engage one another at their side faces in a manner hindering deformation with an abrupt increase in the stiffness of the energy absorber. By this means, braking with a relatively low deceleration is achieved in a collision with the leg, whereas the energy absorber is adequately stiff in a collision with a larger object.

The object of the invention is to specify an energy absorber of the type mentioned at the outset that is characterized, firstly, by high energy absorption in collisions with objects the size of a human leg of standard dimensions, and secondly, by great stiffness in collisions with objects that are relatively large in comparison thereto.

DESCRIPTION OF THE DRAWINGS

Additional useful embodiments of the invention are the object of the following description of exemplary embodiments with reference to the Figures.

Figure 1:
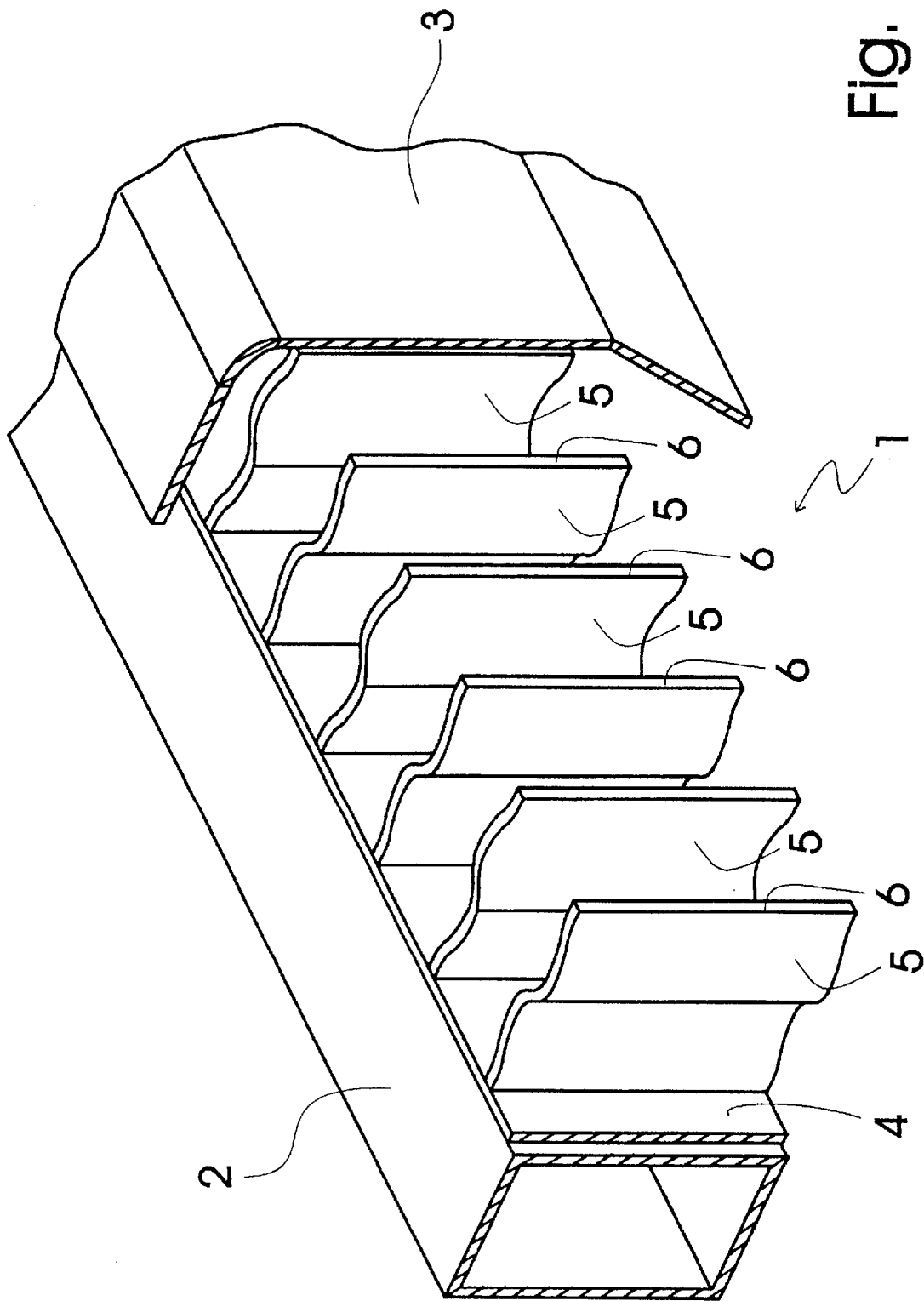
FIG. 1 shows an isometric, partially sectioned view as a detail of a first exemplary embodiment of an energy absorber in accordance with the invention that is arranged between a bumper bracket and a bumper shell of a motor vehicle bumper and that has stiffening lamellae.

This object is achieved in an energy absorber of the aforementioned type in accordance with the invention in that the lateral center-to-center distance corresponds to the standard dimensions of a human leg, in that the stiffening elements deform in the event of collision with an object the size of a human leg of standard dimensions with essentially unimpeded and mutually independent energy-absorbing deformation of side faces which face one another, and in that the stiffening elements engage one another at their side faces in a manner hindering deformation with an abrupt increase in the stiffness of the energy absorber in the event of collision with an object larger than the standard dimensions of a human leg.

DETAILED DESCRIPTION OF THE INVENTION

The fact that the stiffening elements are arranged with a lateral separation from one another that is adapted to the dimensions of a human leg has the result that, when a collision with a human leg occurs, because of the essentially unimpeded energy-absorbing deformation of the adjacent side faces of independently acting stiffening elements that are plastically or elastically deformable at relatively low energy, the leg is braked with relatively low deceleration, so that the leg is subjected to relatively low acceleration as compared to energy absorbers of conventional design, and the risk of severe injury, especially to the knee area, is reduced. In collisions with relatively large objects, however, the stiffening interaction among the side faces of many stiffening elements causes an abrupt increase in stiffness in order to avoid damage to the vehicle.

In one embodiment, provision is made for the stiffening elements to be rib-like stiffening lamellae that extend over essentially the entire height and width of a bumper bracket and that have flat side surfaces as side faces. This embodiment is characterized by its ease of manufacture and light weight.

In a refinement thereof, provision is made for the stiffening lamellae to have corrugated side faces. In this way, predetermined bending lines are prepared at the corrugated areas of the side faces, which bring about controlled deformation of the stiffening lamellae.

In another embodiment, provision is made for the stiffening elements to be stiffening loops with a flattened, elongated front side and with loop edges joined at the transverse portions of the front side as side faces, wherein the loop edges are capable of connection to the bumper bracket by means of rear sections as a mounting structure, and loop edges of stiffening loops that are adjacent in the longitudinal direction are in contact with one another in a contact section. This embodiment achieves a relatively large support area for the bumper shell through the relatively large area of the front sides, wherein the stiffening loops possess a relatively high elastic deformability and a defined deformation behavior in the event of collision with a relatively large object.

In a further refinement of this last embodiment, provision is made for the stiffening loops to be arranged in two outer rows and one inner row located between the outer rows, wherein the stiffening loops of the outer rows are located opposite one another in pairs and the stiffening loops of the inner row are located midway between opposing pairs of outer-row stiffening loops. As a result of the offset arrangement of the stiffening loops, the areal support of the bumper shell is further improved.

Additional useful embodiments of the invention are the object of the following description of exemplary embodiments with reference to the Figures.

Figure 2:
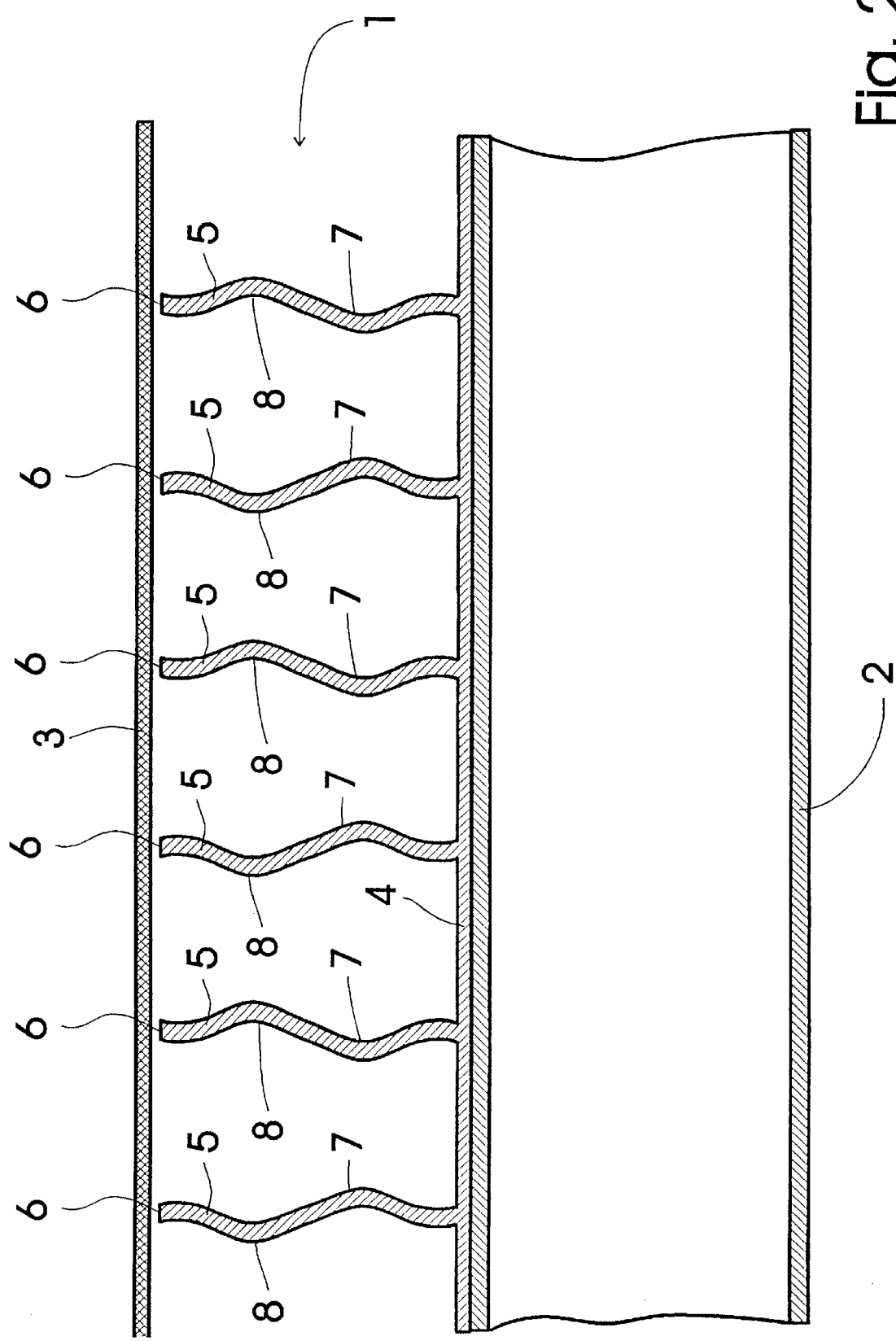
FIG. 2 shows a longitudinal section as a detail of the exemplary energy absorber from FIG. 1.
Figure 3:
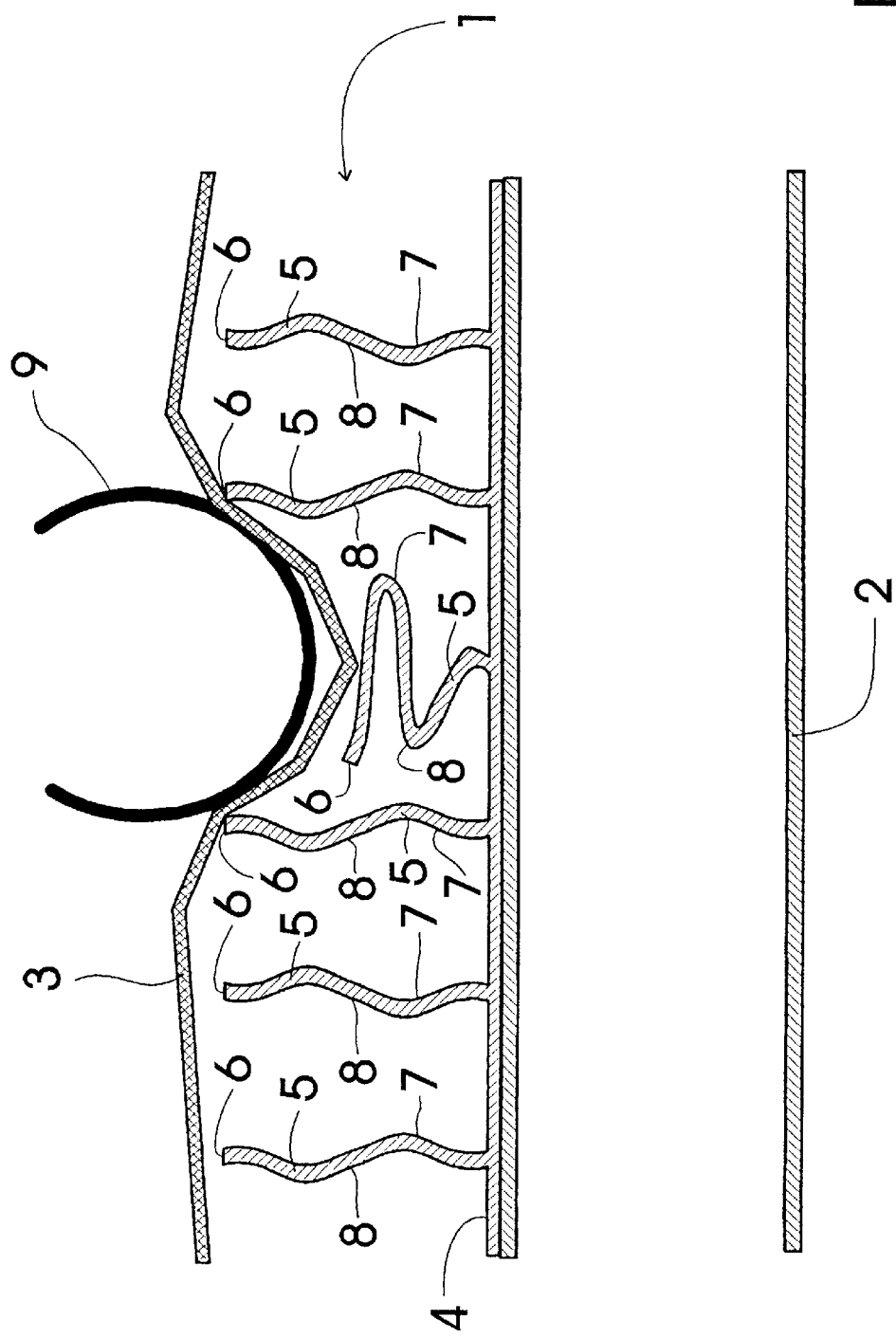
FIG. 3 shows a longitudinal section as a detail of the exemplary energy absorber from FIG. 1 and FIG. 2 in a collision with a first impactor which has the standard dimensions of a human leg.
Figure 4:
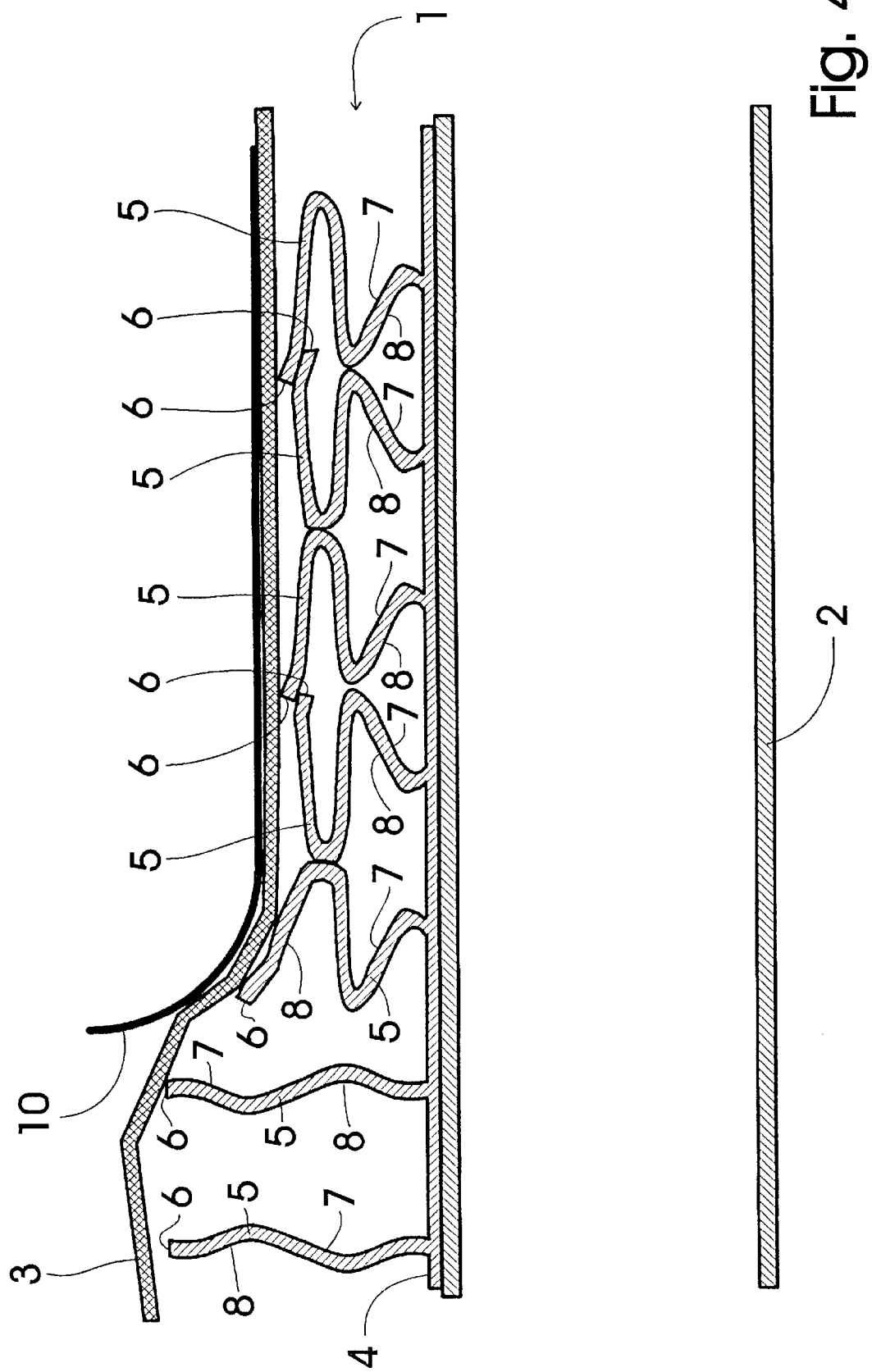
FIG. 4 shows a longitudinal section as a detail of the exemplary energy absorber from FIG. 1 and FIG. 2 in a collision with a second impactor which has far larger dimensions than a human leg.
Figure 5:
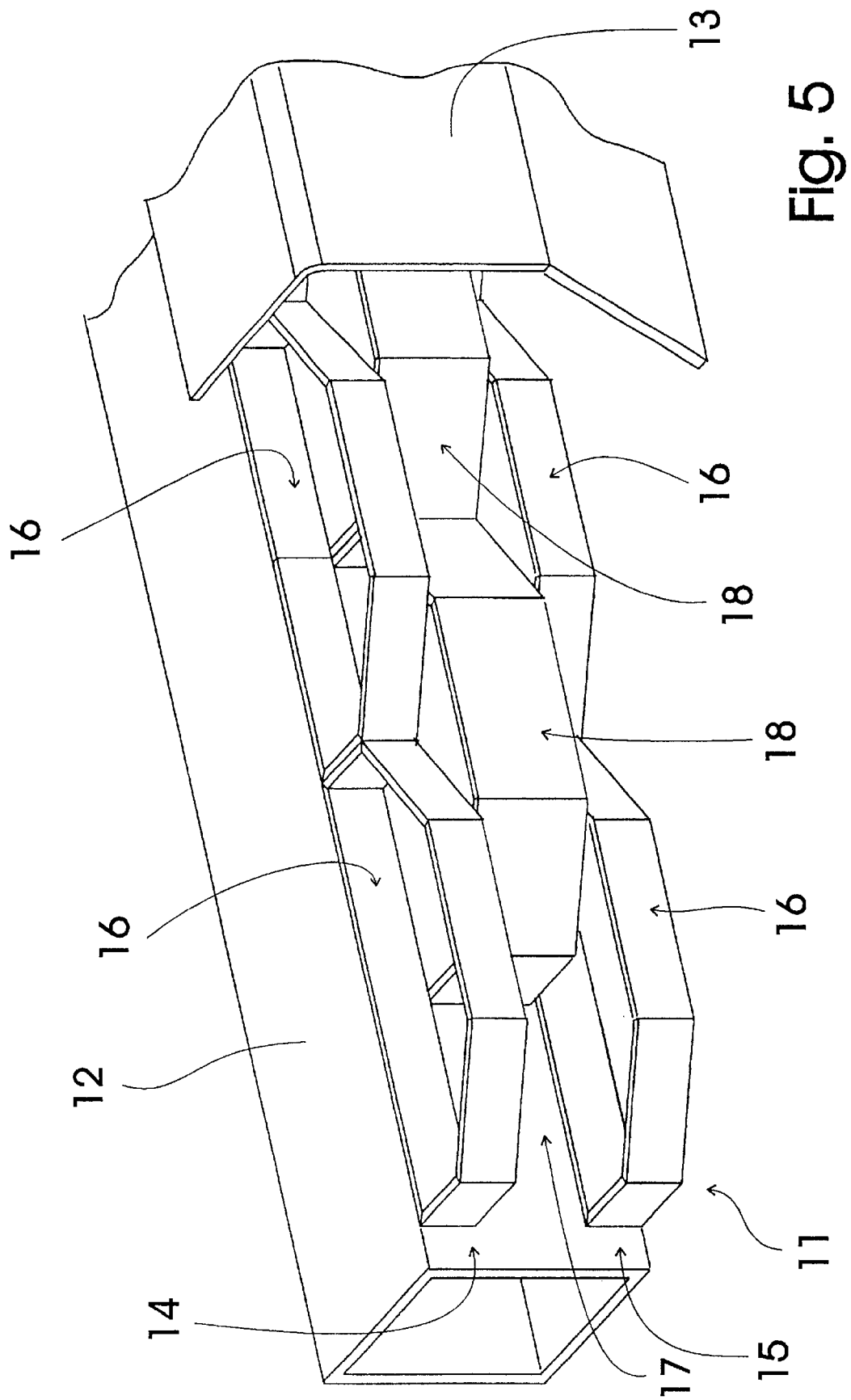
FIG. 5 shows an isometric, partially sectioned view as a detail of a second exemplary embodiment of an energy absorber in accordance with the invention that is arranged between a bumper bracket and a bumper shell of a motor vehicle bumper and that has stiffening loops.
Figure 6:
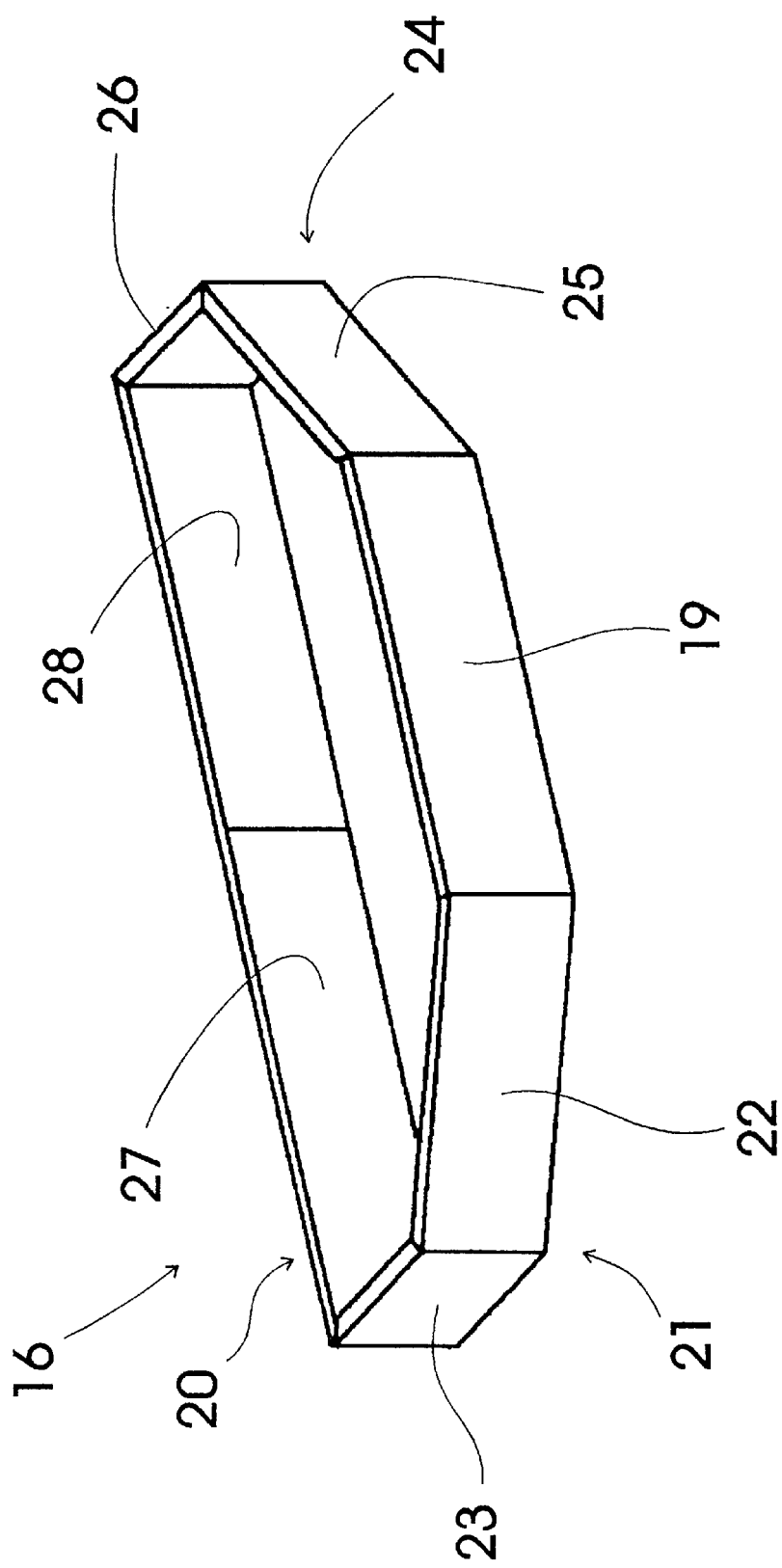
FIG. 6 shows an isometric view of a stiffening loop arranged in an outside row in the exemplary energy absorber from FIG. 5.
Figure 7:
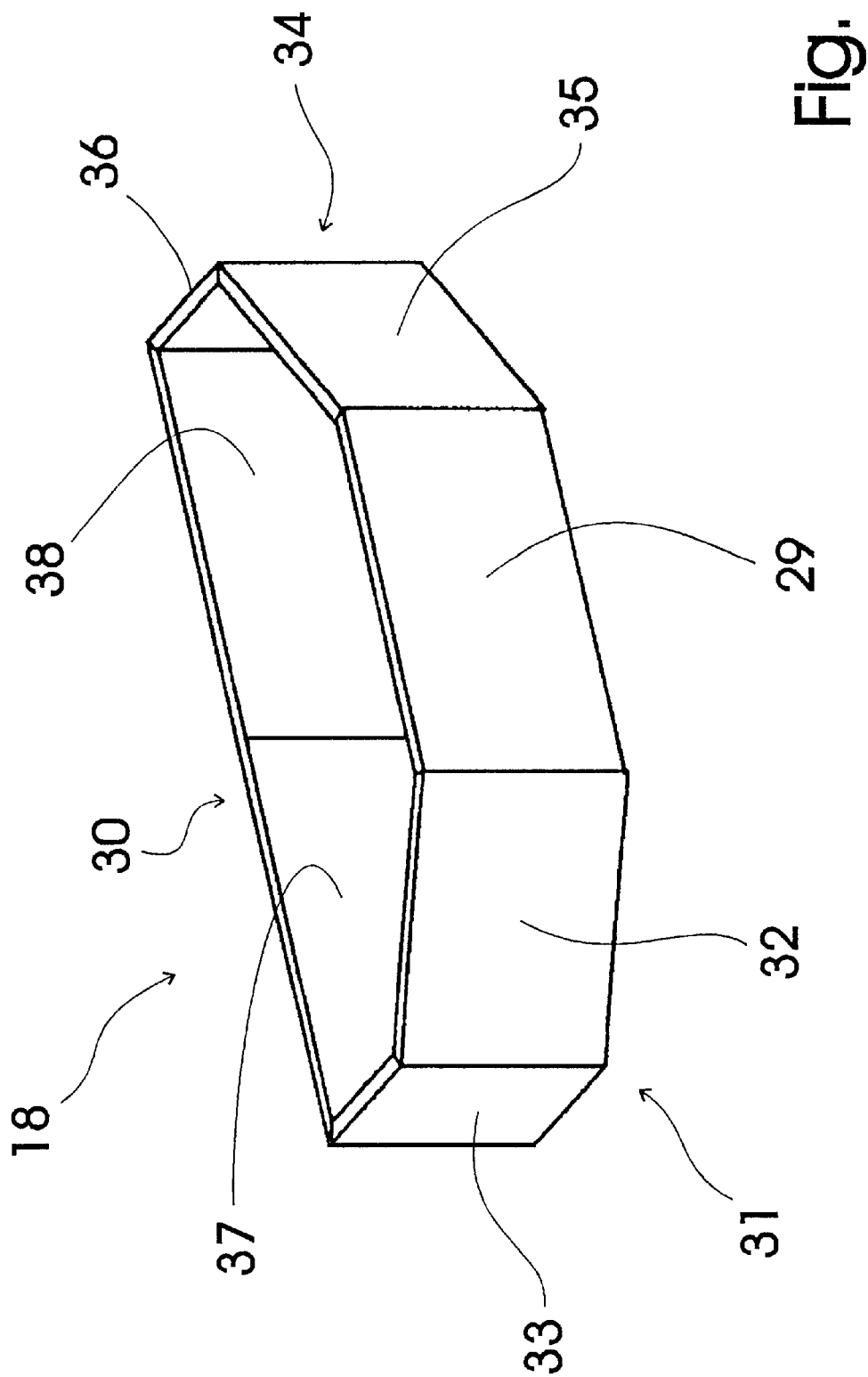
FIG. 7 shows an isometric view of a stiffening loop arranged in an inside row in the exemplary energy absorber from FIG. 5.
Figure 8:
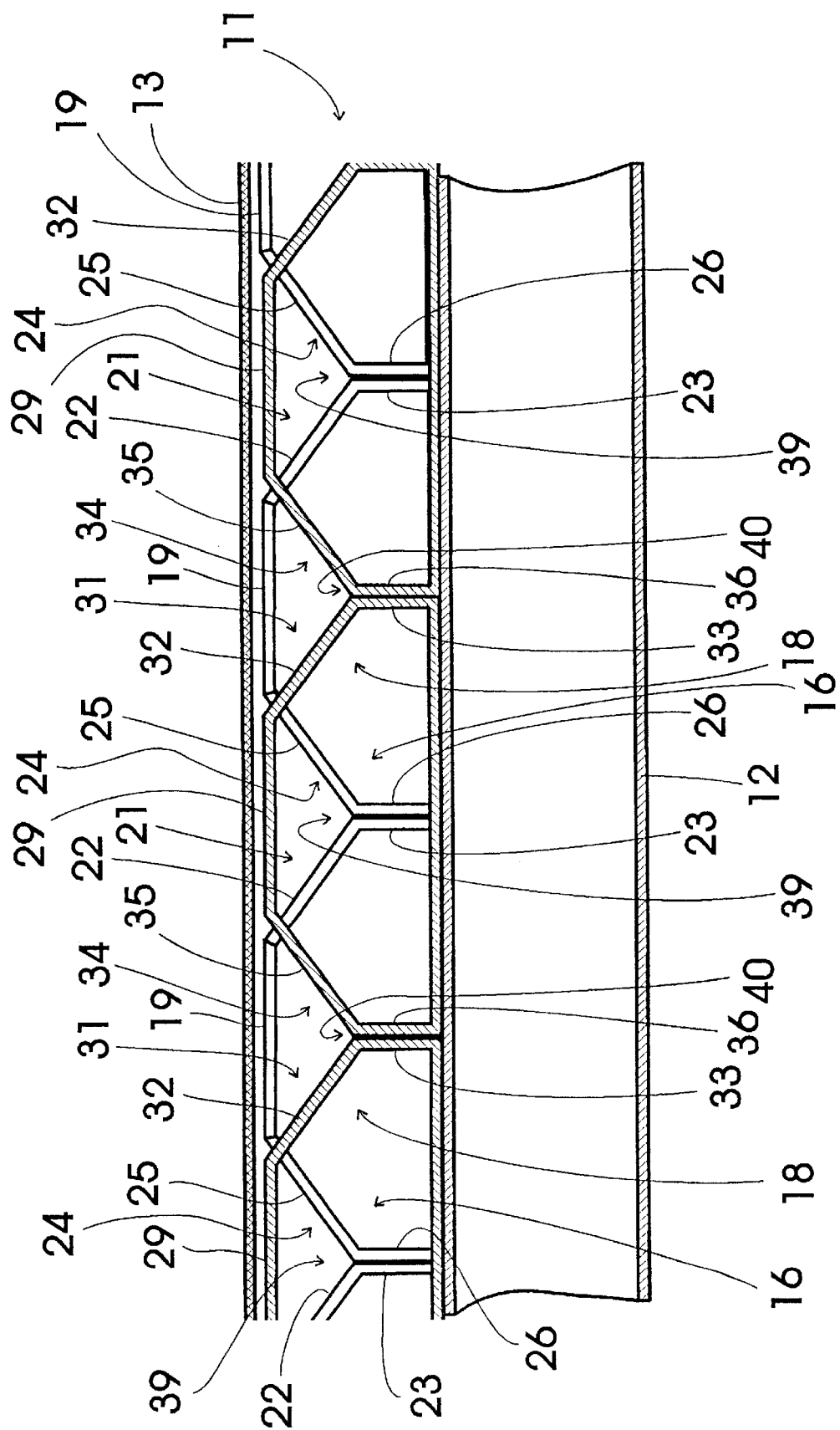
FIG. 8 shows a longitudinal section as a detail of the exemplary energy absorber in accordance with FIG. 5 through FIG. 7.
Figure 9:
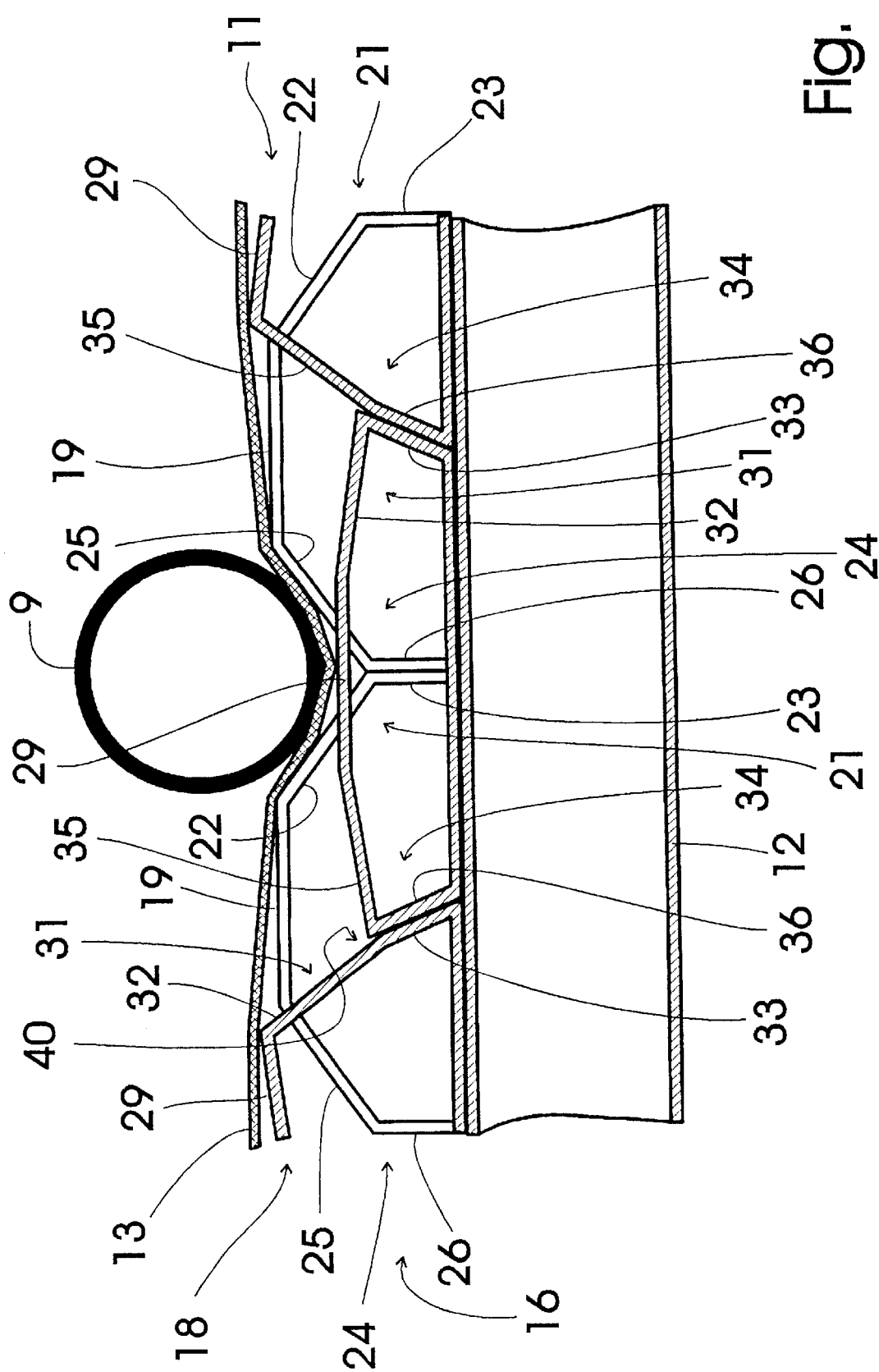
FIG. 9 shows a longitudinal section as a detail of the exemplary energy absorber in accordance with FIG. 5 through FIG. 7 in a collision with the first impactor shown in FIG. 3.
Figure 10:
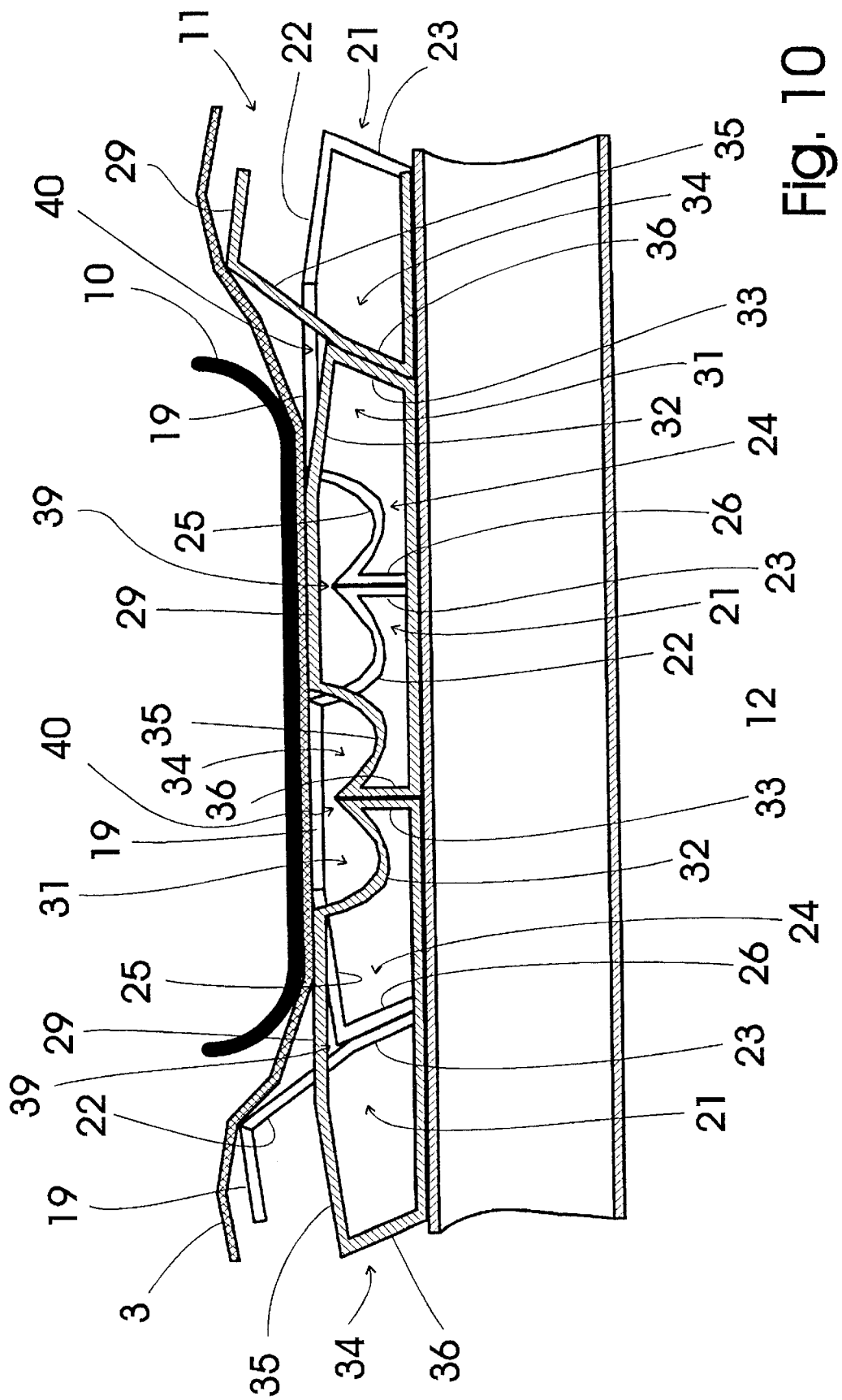
FIG. 10 shows a longitudinal section as a detail of the exemplary energy absorber in accordance with FIG. 5 through FIG. 7 in a collision with the second impactor shown in FIG. 4.

FIG. 1 shows an isometric, partially sectioned view as a detail of a first exemplary embodiment of an energy absorber in accordance with the invention that is arranged between a bumper bracket and a bumper shell of a motor vehicle bumper and that has stiffening lamellae;

FIG. 2 shows a longitudinal section as a detail of the exemplary energy absorber from FIG. 1;

FIG. 3 shows a longitudinal section as a detail of the exemplary energy absorber from FIG. 1 and FIG. 2 in a collision with a first impactor which has the standard dimensions of a human leg;

FIG. 4 shows a longitudinal section as a detail of the exemplary energy absorber from FIG. 1 and FIG. 2 in a collision with a second impactor which has far larger dimensions than a human leg;

FIG. 5. shows an isometric, partially sectioned view as a detail of a second exemplary embodiment of an energy absorber in accordance with the invention that is arranged between a bumper bracket and a bumper shell of a motor vehicle bumper and that has stiffening loops;

FIG. 6 shows an isometric view of a stiffening loop arranged in an outside row in the exemplary energy absorber from FIG. 5;

FIG. 7 shows an isometric view of a stiffening loop arranged in an inside row in the exemplary energy absorber from FIG. 5;

FIG. 8 shows a longitudinal section as a detail of the exemplary energy absorber in accordance with FIG. 5 through FIG. 7;

FIG. 9 shows a longitudinal section as a detail of the exemplary energy absorber in accordance with FIG. 5 through FIG. 7 in a collision with the first impactor shown in FIG. 3, and FIG. 10 shows a longitudinal section as a detail of the exemplary energy absorber in accordance with FIG. 5 through FIG. 7 in a collision with the second impactor shown in FIG. 4.

FIG. 1 shows an isometric, partially sectioned view as a detail of a first exemplary embodiment of an energy absorber 1 in accordance with the invention, preferably made of plastic, which when used as directed is arranged between an elongated bumper bracket 2 and a bumper shell 3 of a motor vehicle bumper. The energy absorber 1 shown in FIG. 1 has a flat carrier plate 4 as mounting structure, which is capable of attachment to a flat side of the bumper bracket 2. Regularly spaced, rib-like stiffening lamellae 5 protrude from the carrier plate 4 as stiffening elements facing away from the bumper bracket 2; the free-standing front sides 6 of said lamellae adjoin the inner side of the bumper shell 3 facing toward the bumper bracket 2 and extend essentially over the entire height and width of the bumper bracket 2.

FIG. 2 shows a longitudinal section as a detail of the exemplary energy absorber 1 from FIG. 1. It can be seen from FIG. 2 that the stiffening lamellae 5 are designed with corrugated, flat side surfaces 7, 8 as side faces, and predetermined bending lines are formed along the convex and concave areas of the side surfaces 7, 8.

FIG. 3 shows a longitudinal section as a detail of the exemplary energy absorber 1 from FIG. 1 and FIG. 2 in a collision with a rounded first impactor 9, which has the standard dimensions of a human leg as defined by generally recognized standards, in the transverse direction of the energy absorber 1. It can be seen from FIG. 3 that the stiffening lamellae 5 have a lateral separation in the transverse direction of the energy absorber 1 that corresponds to approximately half the diameter of the first impactor 9. This ensures that at least one stiffening lamella 5 is always located between the first impactor 9 and the bumper bracket 2 in the event of a collision of the first impactor 9 with the bumper composed of the energy absorber 1, the bumper bracket 2 and the bumper shell 3.

In the collision shown by way of example in FIG. 3, the first impactor 9 hits a stiffening lamella 5 essentially in the center. In the illustrated position of the first impactor 9, the bumper shell 3 is deformed toward the bumper bracket 2 with preferred buckling of the intermediate stiffening lamella 5 along the predetermined bending lines. The energy of the first impactor 9 in this collision is essentially absorbed by the intermediate stiffening lamella 5 deforming independently of the adjacent stiffening lamellae 5 with relatively low negative acceleration over a relatively long braking distance, so that in the event of an actual collision with a human leg, forces would be exerted on the knee joint located at the height of the bumper that would lead to a reduction in the risk of serious injury in the area of the knee joint.

FIG. 4 shows a longitudinal section as a detail of the exemplary energy absorber 1 from FIG. 1 and FIG. 2 in a collision with a second impactor 10 which has far larger dimensions than a human leg, and accordingly extends across a plurality of stiffening lamellae 5 in the transverse direction of the energy absorber 1. During the collision with the second impactor 10, several stiffening lamellae 5 are deformed; beyond a certain penetration depth of the impactor 10, the side surfaces 7, 8 of adjacent stiffening lamellae 5 come into contact with one another, hindering further lateral deformation, and brake the second impactor 10 with high deceleration and an abrupt increase in the stiffness of the energy absorber 1, due to the fact that additional deformation can only be accomplished with increased deformation work.

In this way, the energy absorber 1 continues to provide effective energy absorption in the event of a collision with an object of relatively large area, such as the second impactor 10, while achieving relatively low, injury-reducing decelerations of objects such as a human leg that are relatively small in the transverse direction.

FIG. 5 shows an isometric, partially sectioned view as a detail of a second exemplary embodiment of an energy absorber 11 in accordance with the invention that is arranged between a bumper bracket 12 and a bumper shell 13 of a motor vehicle bumper. As stiffening elements, the exemplary energy absorber 11 shown in FIG. 5 has outer stiffening loops 16 arranged in a first outer edge row 14 and a second outer edge row 15 as well as inner stiffening loops 18 arranged in one inner row 17 located between the outer rows 14, 15. The stiffening loops 16, 18 are attached to the bumper bracket 12 and preferably are made of plastic. The outer stiffening loops 16 of the outer rows 14, 15 are located opposite one another in pairs, whereas the inner stiffening loops 18 are located midway between opposite pairs of outside stiffening loops 16.

FIG. 6 shows an isometric view of an example of an outer stiffening loop 16 arranged in an outside row 14, 15 in the exemplary energy absorber 11 from FIG. 5. The outer stiffening loop 16 has a flattened front side 19 that faces the bumper shell 13 and extends along the longitudinal direction of the bumper bracket 12. Adjoining a transverse edge of the front side 19 in the direction of a rear side 20 adjacent to the bumper bracket 2 as a side face is a projecting first loop edge 21, which has a first edge section 22 that is attached to the corresponding transverse edge of the front side 19 and is angled away from the front side 19 toward the rear side 20, and a continuing second edge section 23 that is angled away from the first edge section 22 toward the rear side 20.

Adjoining the other transverse edge of the front side 19 in the direction of the rear side 20 as a side face is a projecting second loop edge 24, which, like the first loop edge 21, has a first edge section 25 that is attached to the corresponding transverse edge of the front side 19 and is angled away from the front side 19 toward the rear side 20, and a continuing second edge section 26 that is angled away from the first edge section 25 toward the rear side 20.

Joined as a mounting structure to the ends of the loop edges 21, 24 facing the bumper bracket 12 are a first rear section 27 and a second rear section 28 whose ends facing away from the loop edges 21, 24 adjoin one another and form the flattened rear side 20.

FIG. 7 shows a perspective view of an inner stiffening loop 18 arranged in the inner row 16 in the exemplary energy absorber 11 from FIG. 5. The inner stiffening loop 18 has a flattened front side 29 that faces the bumper shell 13 and extends along the longitudinal direction of the bumper bracket 12. Adjoining a transverse edge of the front side 29 in the direction of a rear side 30 adjacent to the bumper bracket 12 as a side face is a projecting first loop edge 31, which has a first edge section 32 that is attached to the corresponding transverse edge of the front side 29 and is angled away from the front side 29 toward the rear side 30, and a continuing second edge section 33 that is angled away from the first edge section 32 toward the rear side 30.

Adjoining the other transverse edge of the front side 29 in the direction of the rear side 30 as a side face is a projecting second loop edge 34, which like the first loop edge 31 has a first edge section 35 that is attached to the corresponding transverse edge of the front side 29 and is angled away from the front side 29 toward the rear side 30, and a continuing second edge section 36 that is angled away from the first edge section 35 toward the rear side 30.

Joined as a mounting structure to the ends of the loop edges 31, 34 facing the bumper bracket 12 are a first rear section 37 and a second rear section 38 whose ends facing away from the loop edges 31, 34 adjoin one another and form the flattened rear side 30.

The significant difference between the outer stiffening loops 16 and the inner stiffening loops 18 is that the inner stiffening loops 18 are larger in the transverse direction than the inner [sic] stiffening loops 16.

FIG. 8 shows a longitudinal section as a detail of the exemplary energy absorber 11 from FIG. 5 through FIG. 7 in the region of the inner row 17. It can be seen from FIG. 8 that the second edge sections 23, 26 of adjacent outer stiffening loops 16 lie flat against one another at an outer contact section 39, and the second edge sections 33, 36 of adjacent inner stiffening loops 18 lie flat against one another at an inner contact section 40. The front sides 19, 29 of the stiffening loops 16, 18 are arranged essentially in a plane that acts as a support for the bumper shell 13.

FIG. 9 shows a longitudinal section as a detail of the exemplary energy absorber 11 from FIG. 5 through FIG. 7 in the region of the inner row 17 in the event of a collision with the first impactor 9 from FIG. 3 in the region between two outer stiffening loops 16. It can be seen from FIG. 9 that the stiffening loops 16, 18 are separated by a center-to-center distance corresponding to the standard dimensions of a human leg stated in connection with the first exemplary embodiment. In the collision shown, the energy is largely absorbed by an inner stiffening loop 18 that is flattened by approximately half of its projection from the bumper bracket 12 while braking the first impactor 9 with relatively low deceleration. In this process, the second edge sections 33, 36 of the edge loops 31, 34 deflect laterally and slightly deform the adjacent inner stiffening loops 18, but without the adjacent inner stiffening loops 18 absorbing significant energy thereby.

FIG. 10 shows a longitudinal section as a detail of the exemplary energy absorber 11 from FIG. 5 through FIG. 7 in the region of the inner row 17 in the event of a collision with the large second impactor 10 from FIG. 4. It can be seen from FIG. 4 that in this collision the energy is absorbed by several outer stiffening loops 16 and inner stiffening loops 18. The second edge sections 23, 26, 33, 36 of the loop edges 21, 24, 31, 34 now mutually block the energy absorber 11 to a significant degree, so that the first edge sections 22, 25, 32, 35 of the loop edges 21, 24, 31, 34 of both the outer stiffening loops 16 and the inner stiffening loops 18 are deformed with a substantial absorption of energy.

In this way, the energy absorber 11 continues to provide effective energy absorption in the event of a collision with an object of relatively large area, such as the second impactor 10, while achieving relatively low, injury-reducing deceleration of objects such as a human leg that are relatively small in the transverse direction.

What is claimed is:

1. An energy absorber for motor vehicle bumpers with a number of stiffening elements arranged between a bumper bracket and a bumper shell of a bumper, wherein the stiffening elements have front sides facing away from a rear mounting structure that is capable of being fastened to the bumper bracket, and whose centers are also laterally offset from one another in the longitudinal direction, the lateral center-to-center distance corresponding to the dimensions of a human leg, whereas the stiffening elements are stiffening loops with flattened, elongated front sides and with loop edges joined at the transverse edges of the front side, wherein the loop edges are capable of connection to the bumper bracket by means of rear sections and loop edges of stiffening loops that are adjacent in the longitudinal direction are in contact with one another, thus the stiffening elements deforming in the event of a collision with a first object having the size of a human leg with essentially unimpeded and mutually independent energy-absorbing deformation of side faces which face one another, and the stiffening elements engaging one another at their side faces in a manner hindering lateral deformation with an abrupt increase in the stiffness of the energy absorber in the event of collision with a second object larger than the dimensions of a human leg.

2. The energy absorber of claim 1, characterized in that the stiffening loops are arranged in two outer edge rows and one inner row located between the outer rows, wherein the stiffening loops of the outer rows are located opposite one another in pairs and the stiffening loops of the inner row are located midway between opposing pairs of stiffening loops in the outer rows.

* * * * *